United States Patent
Nishifukumoto et al.

(10) Patent No.: US 10,312,757 B2
(45) Date of Patent: Jun. 4, 2019

(54) PERMANENT MAGNET ROTOR FOR SYNCHRONOUS ELECTRIC MOTOR

(71) Applicant: FANUC CORPORATION, Yamanashi (JP)

(72) Inventors: Akira Nishifukumoto, Yamanashi (JP); Hidetoshi Mitsui, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/290,017

(22) Filed: Oct. 11, 2016

(65) Prior Publication Data

US 2017/0117765 A1 Apr. 27, 2017

(30) Foreign Application Priority Data

Oct. 22, 2015 (JP) .................................. 2015-207789

(51) Int. Cl.
  *H02K 1/28* (2006.01)
  *H02K 1/27* (2006.01)
  *H02K 29/03* (2006.01)

(52) U.S. Cl.
  CPC ............. *H02K 1/28* (2013.01); *H02K 1/278* (2013.01); *H02K 29/03* (2013.01)

(58) Field of Classification Search
  CPC ................................. H02K 1/278; H02K 1/28
  USPC ....................... 310/156.08, 156.12
  IPC .................................................. H02K 1/27,1/28
  See application file for complete search history.

(56) References Cited

U.S. PATENT DOCUMENTS

| | | | | |
|---|---|---|---|---|
| 2002/0162939 | A1* | 11/2002 | Heidrich | H02K 1/278 248/683 |
| 2008/0048517 | A1* | 2/2008 | Ochiai | H02K 1/278 310/216.004 |
| 2009/0261677 | A1* | 10/2009 | Ishikawa | H02K 1/278 310/156.12 |
| 2010/0244605 | A1* | 9/2010 | Nakano | B62D 5/0403 310/156.01 |
| 2011/0316378 | A1* | 12/2011 | Matt | H02K 1/2773 310/156.53 |
| 2012/0133229 | A1* | 5/2012 | Jayasoma | H02K 1/278 310/156.01 |
| 2015/0001970 | A1* | 1/2015 | Zhang | H02K 21/16 310/43 |

(Continued)

FOREIGN PATENT DOCUMENTS

| | | |
|---|---|---|
| JP | 9205747 A | 8/1997 |
| JP | 2006008964 A1 | 1/2006 |

(Continued)

OTHER PUBLICATIONS

English Abstract and Machine Translation for Japanese Publication No. 09-205747, published Aug. 5, 1997, 10 pgs.

(Continued)

*Primary Examiner* — Thomas Truong
(74) *Attorney, Agent, or Firm* — Fredrikson & Byron, P.A.

(57) ABSTRACT

Provided is a permanent magnet rotor that includes a plurality of magnets sequentially disposed on an outer circumferential surface of a core having a cylindrical shape along a circumferential direction of the core and a plurality of projection portions each disposed between the magnets adjacent to each other. Then a cover portion is formed such that a height of a space in a radial direction of the core is more reduced as from a base portion of the projection portions toward a tip end of the cover portion.

1 Claim, 4 Drawing Sheets

(56) References Cited

U.S. PATENT DOCUMENTS

2015/0214798 A1\* 7/2015 Tajima ................. H02K 21/16
310/156.19

FOREIGN PATENT DOCUMENTS

| JP | 2011217601 A | 10/2011 |
|----|--------------|---------|
| JP | 2015122842 A | 7/2015  |

OTHER PUBLICATIONS

English Abstract and Machine Translation for Japanese Publication No. 2015-122842, published Jul. 2, 2015, 13 pgs.
English Abstract and Machine Translation for WO/Japanese Publication No. 2006-008964 A1, published Jan. 26, 2006, 14 pgs.
English Abstract and Machine Translation for Japanese Publication No. 2011-217601 A, published Oct. 27, 2011, 13 pgs.

\* cited by examiner

LENGTH OF MAGNET IN CORE CIRCUMFERENTIAL DIRECTION[mm]

PERMANENT MAGNET ROTOR FOR SYNCHRONOUS ELECTRIC MOTOR

BACKGROUND OF THE INVENTION

1. Field of the Invention

The present invention relates to a permanent magnet rotor (hereinafter, briefly referred to as rotor) for a synchronous electric motor.

2. Description of the Related Art

As a rotor of a synchronous electric motor, commonly, either a radial type rotor or a surface magnet type rotor is used. The radial type rotor is configured by sequentially disposing a rotor core forming a yoke and a permanent magnet in an alternate manner in a circumferential direction. On the other hand, the surface magnet type rotor is configured by sequentially sticking a plurality of permanent magnets on an outer circumferential surface of a cylindrical rotor core in a circumferential direction.

On the permanent magnets of the rotor as described above, a centrifugal force following rotation of the rotor and a magnetic attraction force due to a magnetic field of a stator disposed around the rotor act at a radial direction outer side of the rotor. Consequently, particularly in the surface magnet type rotor, the permanent magnets must be fixed so that even when the centrifugal force and the magnetic attraction force as described above act on the permanent magnets for a long period, the permanent magnets are not separated from the outer circumferential surface of the rotor core.

Figure 6:
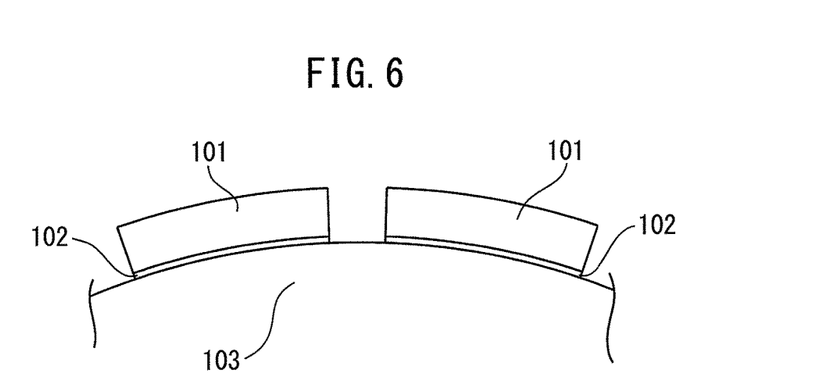
FIG. 6 is an enlarged diagram illustrating a cross-sectional structure of a part of a rotor according to a first conventional method.
Figure 7:
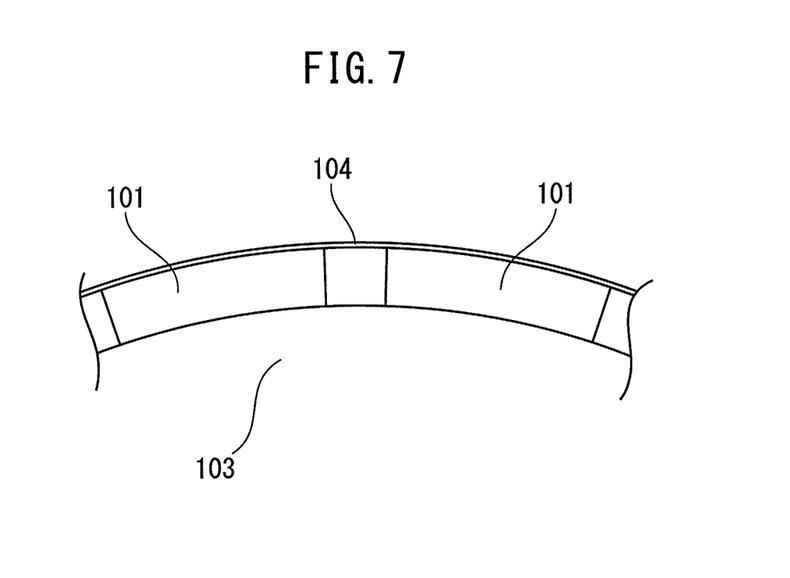
FIG. 7 is an enlarged diagram illustrating a cross-sectional structure of a part of the rotor according to a second conventional method.
Figure 8:
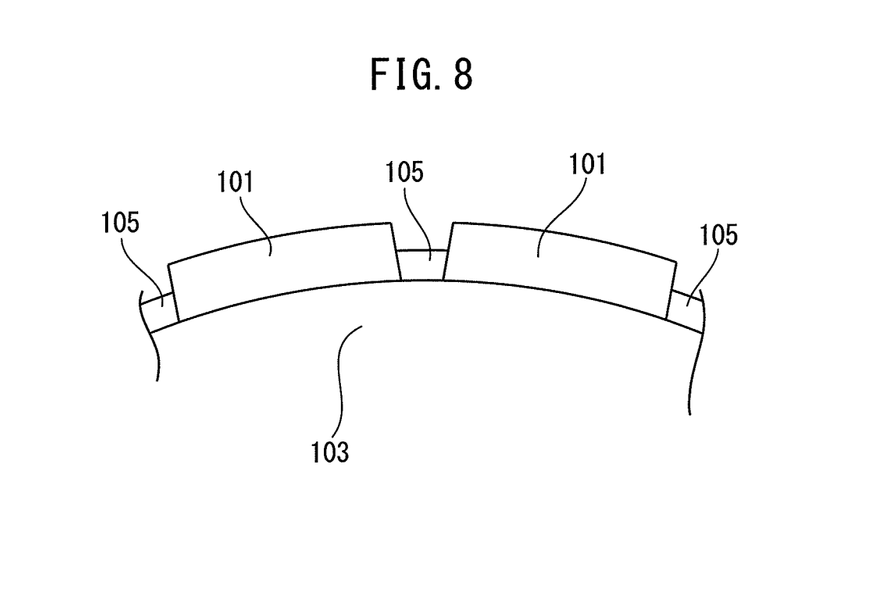
FIG. 8 is an enlarged diagram illustrating a cross-sectional structure of a part of the rotor according to a third conventional method.

Accordingly, in the surface magnet type rotor, hitherto, permanent magnet fixing methods as illustrated in FIG. 6-8 have been proposed. FIGS. 6-8 are diagrams illustrating an enlarged cross-sectional structure of a part of a rotor according to conventional methods 1-3, respectively. In particular, the diagrams are views in which a permanent magnet fixing structure relative to a rotor core is seen from a direction along a rotation axis of the rotor.

In the conventional method 1 as illustrated in FIG. 6, each of a plurality of permanent magnets 101 is bonded and fixed to an outer circumferential surface of a rotor core 103 by a resin or a bonding agent 102.

In the conventional method 2 as illustrated in FIG. 7, while each of the plurality of permanent magnets 101 is sequentially disposed on the outer circumferential surface of the rotor core 103, an insulation tape 104, such as a glass cloth, is wound around an outer circumference of the rotor core 103. Thereby, each permanent magnet 101 is sandwiched between the rotor core 103 and the insulation tape 104 to be fixed.

In the conventional method 3 as illustrated in FIG. 8, both side surfaces of the permanent magnets 101 are formed into a tapered shape and a plurality of engagement portions 105 having a reverse taper shape that tightly engage with the both side surfaces of the permanent magnets 101 are sequentially provided on the outer circumferential surface of the rotor core 103, thereby fixing each permanent magnet 101 using a wedge effect.

In addition, a synchronous electric motor including such a rotor as described above is often adopted for a feed axis of a machine tool. Since the smoothness of rotation of the electric motor greatly influences a machining accuracy of the machine tool, designing the rotor such that a cogging force of the electric motor is as small as possible has been sought.

To reduce the cogging force as described above in the surface magnet type rotor, forming an adequate curved surface on a surface of the permanent magnets opposed to an inner circumferential surface of the stator is needed.

Generally, in the case of the permanent magnets designed as described above, as disclosed in Japanese Laid-open Patent Publication No. H09-205747, Domestic Re-publication of PCT International Application No. 2006-008964, and Japanese Laid-open Patent Publication No. 2015-122842, for example, a thickness size becomes smaller as from a center portion to an end portion of the permanent magnets in the circumferential direction of the rotor core (unillustrated in FIGS. 6-8).

Further, Japanese Laid-open Patent Publication No. H09-205747, Domestic Re-publication of PCT International Application No. 2006-008964, and Japanese Laid-open Patent Publication No. 2015-122842, for example, disclose a plurality of projection portions (unillustrated in FIGS. 6-8) disposed in such a manner as to sandwich each permanent magnet and projecting from the rotor core to a radial direction outer side of the rotor core. Then, the projection portions have a shape for tightly engaging with the end portion of the permanent magnets in the circumferential direction of the rotor core so that the permanent magnets are not separated from the rotor core.

However, when the thickness size of the permanent magnets is configured to become smaller as from the center portion to the end portion of the permanent magnets in the circumferential direction of the rotor core as described above, a permeance coefficient and a demagnetization resistant capacity are more reduced as closer to the end portion of the permanent magnets. As a result, there occurs a problem in that, also when the same demagnetizing field is applied to the permanent magnets in the circumferential direction of the rotor core, the end portion of the permanent magnets is more apt to be demagnetized than the center portion of the permanent magnets.

In addition, when the projection portions are configured to have a shape for tightly engaging with the end portion of the permanent magnets as described above, the permeance coefficient and the demagnetization resistant capacity of the end portion of the permanent magnets are remarkably increased, which accordingly makes it difficult to reduce the cogging force.

Thus, in the surface magnet type rotor, realizing reducing the cogging force and restraining a reduction of the demagnetization resistant capacity of the end portion of the permanent magnets in a balanced manner has been desired.

SUMMARY OF INVENTION

The present invention provides a permanent magnet rotor for a synchronous electric motor that can realize reducing a cogging force and restraining a reduction of a demagnetization resistant capacity at a permanent magnet end portion in a balanced manner.

According to a first aspect of the present invention, provided is a permanent magnet rotor for an electric motor, including: a core having a cylindrical shape; a plurality of magnets sequentially disposed on an outer circumferential surface of the core along a circumferential direction of the core; and a plurality of projection portions each disposed between the magnets adjacent to each other, in which a thickness of the magnets in a radial direction of the core is smaller as from a center portion of the magnets toward an end portion of the magnets in the circumferential direction of the core, the projection portions include a base portion that projects from the outer circumferential surface of the core to a radial direction outer side of the core and a cover portion that extends from the base portion in the circumferential direction of the core and covers the end portion of the magnets through a space, and the cover portion is formed such that a height of the space in the radial direction of the core is more reduced as from the base portion toward a tip end of the cover portion.

According to a second aspect of the present invention, provided is the permanent magnet rotor according to the first aspect as described above, in which the projection portions include a pressing portion that presses the magnets toward the outer circumferential surface of the core.

BRIEF DESCRIPTION OF THE DRAWINGS

These objects, features, and advantages of the present invention and other objects, features, and advantages will become further apparent from the detailed description of typical embodiments of the present invention that are illustrated in the accompanying drawings.

DETAILED DESCRIPTION

Next, embodiments of the present invention will be described with reference to the drawings. In the following figures, the same components will be assigned the same reference signs. In addition, it is assumed that the elements denoted by the same reference signs in different drawings denote elements having the same functions. Further, to facilitate understanding, these figures are suitably changed in scale.

Figure 1:
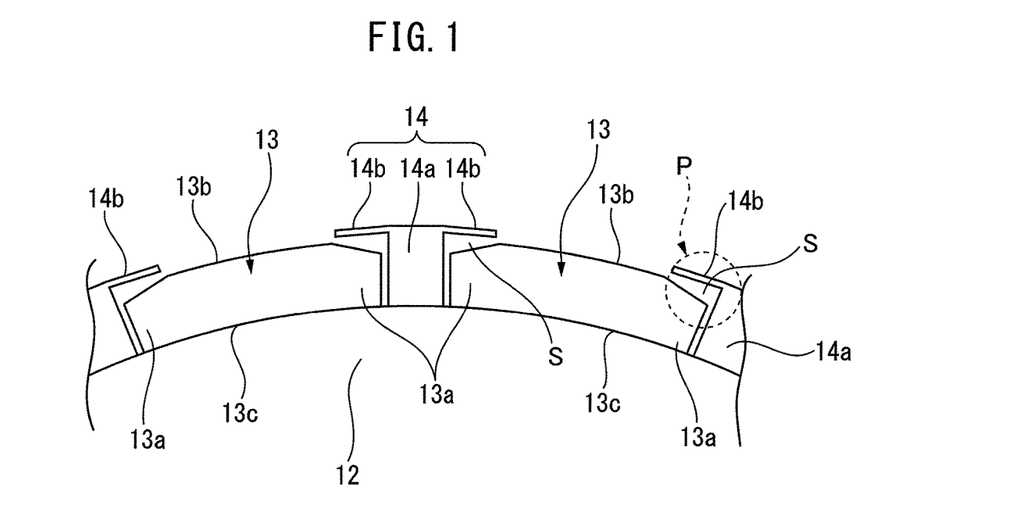
FIG. 1 is an enlarged diagram illustrating a cross-sectional structure of a part of a rotor according to an embodiment.
Figure 2:
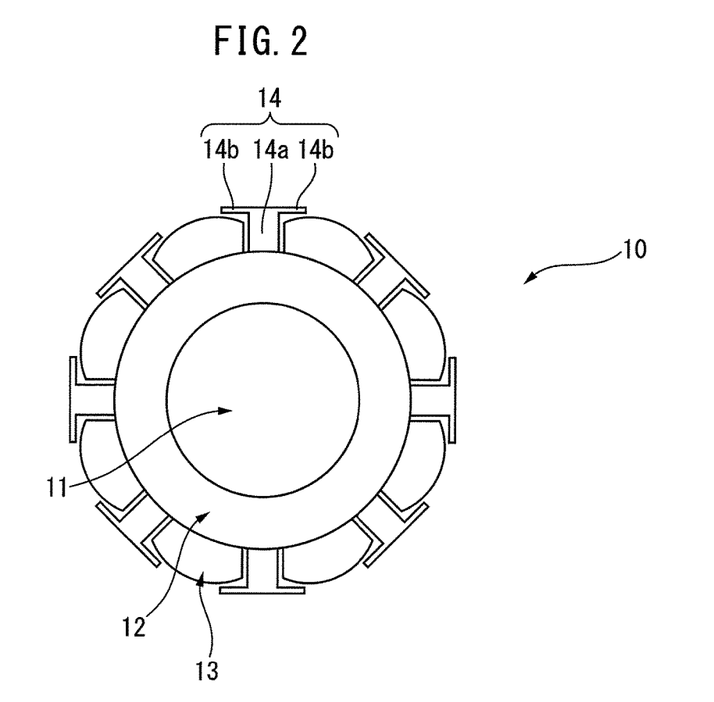
FIG. 2 is a schematic diagram illustrating a cross-sectional structure of the entirety of the rotor according to the embodiment.

FIG. 1 is an enlarged diagram illustrating a cross-sectional structure of a part of a rotor according to an embodiment of the present invention. Further, FIG. 2 is a schematic diagram illustrating a cross-sectional structure of the entirety of the rotor according to the embodiment of the present invention. In particular, the diagrams are a view in which a permanent magnet fixing structure relative to a rotor core is seen from a direction along a rotation axis of the rotor.

With reference to FIGS. 1 and 2, a rotor 10 according to the present embodiment includes a core (iron core) 12 fixed to a shaft 11 and a plurality of permanent magnets 13 sequentially disposed spaced apart at predetermined intervals along a circumferential direction of the core 12 on an outer circumferential surface of the core 12. Note that the rotor 10 according to the present embodiment is a surface magnet type rotor (so-called an SPM rotor) used as a rotor of a synchronous electric motor.

The core 12 has a cylindrical shape. Then, the plurality of permanent magnets 13 are sequentially disposed along the circumferential direction of the core 12 in such a manner that an N pole and an S pole are alternate. Further, as illustrated in FIG. 2, into a hole portion at a center of the cylindrical core 12, the shaft 11 is press-fitted.

In addition, as illustrated in FIGS. 1 and 2, the rotor 10 as described above includes a plurality of projection portions 14 each disposed between the permanent magnets 13 adjacent to each other.

Further specifically, each projection portion 14 includes a base portion 14a that projects from the outer circumferential surface of the core 12 to a radial direction outer side of the core 12 and two cover portions 14b that respectively extend from the base portion 14a toward both sides in the circumferential direction of the core 12. Note that, as illustrated in FIGS. 1 and 2, the projection portions 14 according to the present embodiment form a substantially T-shape as seen from a direction along a rotation axis of the rotor 10.

Further, as illustrated in FIG. 1, each cover portion 14b covers each corresponding end portion 13a of the permanent magnets 13 in the circumferential direction of the core 12 through a gap, i.e., a space S. With respect to the space S, see a region P enclosed by a broken line in FIG. 1.

As apparent from the region P, the cover portions 14b are formed such that a height of the space S in a radial direction of the core 12 is more reduced as from the base portion 14a of the projection portions 14 toward a tip end of the cover portions 14b.

The space S as described above is formed by configuring a surface 13b of the permanent magnets 13 to be a convex curved surface. In particular, in the permanent magnets 13 according to the present embodiment, a thickness size of the permanent magnets 13 in the radial direction of the core 12 becomes smaller as from a center portion to the end portion 13a of the permanent magnets 13 in the circumferential direction of the core 12. Examples of a shape of the surface 13b of the permanent magnets 13 may include an eccentric circular arc shape and a curved line shape defined by a trigonometrical function.

Further, a bottom surface 13c of the permanent magnets 13 is formed in such a manner as to suit the outer circumferential surface of the core 12, while bonded to the outer circumferential surface of the core 12 by a bonding agent of a resin, such as an epoxy type. Each permanent magnet 13 is made of a single magnet, but may be made of a plurality of magnet pieces.

Furthermore, the core 12 as described above is formed by sequentially stacking a plurality of electromagnetic steel plates (unillustrated). Each electromagnetic steel plate includes a ring-shaped portion and a plurality of projection pieces sequentially provided spaced apart at predetermined intervals on an outer circumferential portion of the ring-shaped portion along a circumferential direction and projecting toward a radial direction outer side of the ring-shaped portion. Each projection piece is formed integrally with the ring-shaped portion by punching press of a steel plate. Further, such electromagnetic steel plates are sequentially stacked while the plurality of projection pieces are superimposed, whereby the projection portions 14 are formed integrally with the core 12 as described above. In addition, the electromagnetic steel plates are, for example, a silicon steel plate.

Figure 3:
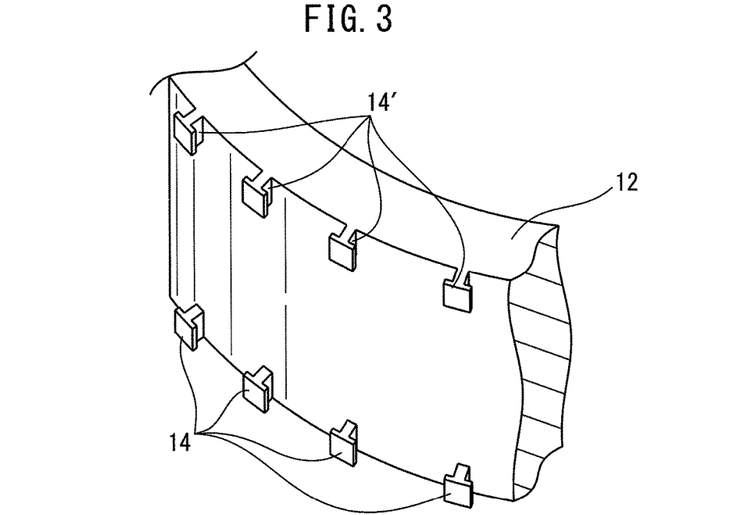
FIG. 3 is an enlarged perspective view illustrating a part of a core constituting the rotor according to the embodiment.

FIG. 3 is an enlarged perspective view illustrating a part of the core 12 as described above and a diagram for describing a disposition example of the projection portions 14 on the outer circumferential surface of the core 12. Note that, in FIG. 3, the shaft 11 and the permanent magnets 13 as described above are unillustrated and only a part of the core 12 is illustrated.

In the embodiment as described above, not only may the plurality of projection portions 14 be sequentially disposed spaced apart at predetermined intervals in the circumferential direction of the core 12, but additional projection portions 14' may be disposed in a direction along a center axis direction of the core 12 at positions corresponding to the respective projection portions 14.

For example, as illustrated in FIG. 3, the certain projection portions 14 may be positioned at one of ends of the core 12 in the center axis direction of the core 12, and the additional projection portions 14' may be positioned at the other end of the core 12 to correspond to the projection portions 14.

Note that, in the present invention, the positions and a number of the projection portions 14 and the additional projection portions 14' each that are to be disposed in the direction along the center axis direction of the core 12 are not limited to positions and a number according to the aspect as illustrated in FIG. 3. For example, without providing the additional projection portions 14', each projection portion 14 may be formed by a single member having a sufficiently large length in the direction along the center axis direction of the core 12.

Next, effects based on a configuration of the rotor 10 according to the present embodiment will be described.

As described above, in the permanent magnets 13 used for the rotor 10 according to the present embodiment, the thickness size of the permanent magnets 13 in a radial direction of the core 12 becomes smaller as from the center portion to the end portion 13a of the permanent magnets 13 in the circumferential direction of the core 12. Further, to the projection portions 14 projecting from the outer circumferential surface of the core 12, the cover portions 14b covering the end portion 13a of the permanent magnets 13 are provided through the space S. Then, the cover portions 14b are formed such that the height of the space S in the radial direction of the core 12 is more reduced as more separated from the base portion 14a of the projection portion 14. According to such a configuration, effects in which reducing a cogging force and restraining a reduction of a demagnetization resistant capacity of the end portion of the permanent magnets can be realized in a balanced manner can be obtained.

Reasons for producing the effects as described above will be described.

Figure 4:
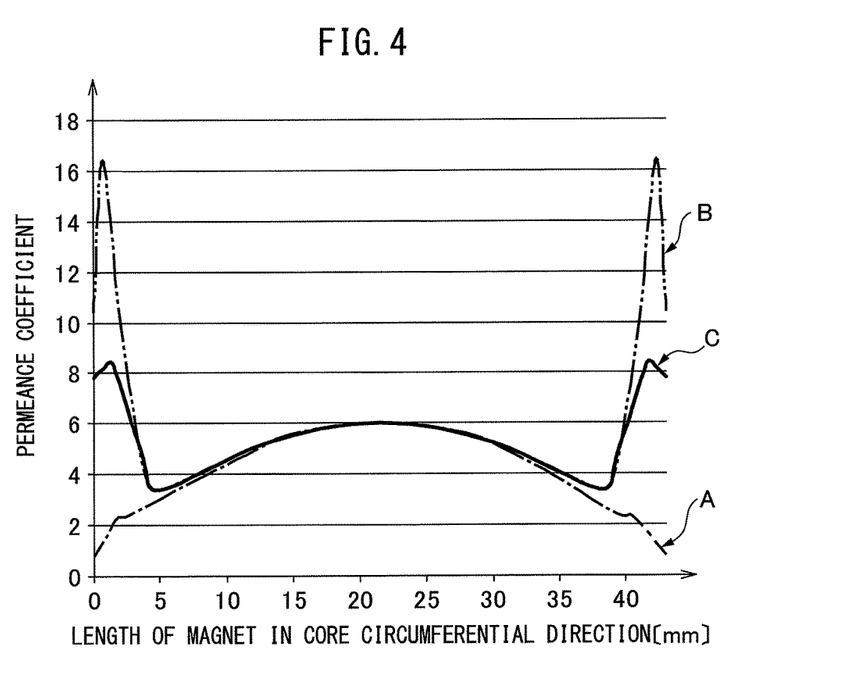
FIG. 4 is a diagram illustrating an analyzed value of a permeance coefficient of one of permanent magnets in the rotor according to the embodiment.

FIG. 4 is a diagram illustrating an analyzed value of a permeance coefficient of one of the permanent magnets 13 in the rotor 10 according to the present embodiment. A center of a horizontal axis of FIG. 4 corresponds to the center portion of the permanent magnets 13 in the circumferential direction of the core 12 as described above, and both ends of the horizontal axis of FIG. 4 respectively corresponds to both ends of the permanent magnets 13 in the circumferential direction of the core 12 as described above. In addition, a vertical axis of FIG. 4 corresponds to a numerical value of the permeance coefficient.

In FIG. 4, a curved line C illustrates a case of the rotor 10 according to the present embodiment, and a curved line A and a curved line B each illustrate a case of a conventional rotor structure.

A conventional rotor structure as illustrated by the curved line A (hereinafter, referred to as conventional example 1) is a rotor structure failing to include the projection portions 14 in contrast to the rotor 10 according to the present embodiment. In addition, a conventional rotor structure as illustrated by the curved line B (hereinafter, referred to as conventional example 2) is a rotor structure failing to have a gap, such as the space S, between the end portion 13a of the permanent magnets 13 and the cover portions 14b of the projection portions 14 in contrast to the rotor 10 according to the present embodiment. In other words, conventional example 2 is a rotor structure as indicated in Japanese Laid-open Patent Publication No. H09-205747, Domestic Re-publication of PCT International Application No. 2006-008964, and Japanese Laid-open Patent Publication No. 2015-122842, in which the projection portions 14 tightly engage with the end portion 13a of the permanent magnets 13 in the circumferential direction of the core 12. Note that, also in a shape of the permanent magnets in conventional example 1 and conventional example 2, similarly to the rotor 10 according to the present embodiment, a thickness of the permanent magnets becomes smaller as from the center portion of the permanent magnets toward the end portion of the permanent magnets in the circumferential direction of the rotor core.

Based on the features as described above, first, effects with respect to a demagnetization resistant capacity will be described.

The permeance coefficient is a reciprocal of a magnetic resistance, and the demagnetization resistant capacity of a permanent magnet is positively correlated to the permeance coefficient.

In a case of conventional example 1 as described above, as apparent from the curved line A in FIG. 4, the permeance coefficient of the end portion of the permanent magnets is low in comparison with the center portion of the permanent magnets. In other words, the demagnetization resistant capacity is more reduced as closer to the end portion of the permanent magnets.

In a case of conventional example 2 as described above, as apparent from the curved line B in FIG. 4, the permeance coefficient of the end portion of the permanent magnets is remarkably increased. In this case, a reduction of a demagnetization resistant capacity at the end portion of the permanent magnets is restrained, whereas, as described below, reducing the cogging force is difficult.

In a case of the rotor 10 according to the present embodiment, since the space S between the end portion 13a of the permanent magnets 13 and the cover portions 14b of the projection portions 14 is more enlarged as closer to the base portion 14a of the projection portions 14, the magnetic resistance of the end portion of the permanent magnets is increased in comparison with conventional example 2. In other words, in comparison with the curved line B in the case of conventional example 2, the permeance coefficient of the end portion of the permanent magnets is reduced. Accordingly, as apparent from the curved line C in FIG. 4, a reduction of the demagnetization resistant capacity at the end portion of the permanent magnets can be restrained while the permeance coefficient of the end portion of the permanent magnets is not remarkably increased.

Next, effects with respect to cogging will be described.

Determined based on a total variation of the permeance coefficient with respect to the plurality of permanent magnets 13 disposed spaced apart at predetermined intervals in the circumferential direction of the core 12, among the curved line A of conventional example 1, the curved line B of conventional example 2, and the curved line C of the present embodiment, the curved line exhibiting the mildest variation of the permeance coefficient is the curved line A of conventional example 1. In other words, in conventional example 1, in comparison with conventional example 2 and the present embodiment, a variation of the magnetic resistance over the circumferential direction of the core 12 is mild. Generally, the less a remarkable variation of the magnetic resistance over the circumferential direction of the core 12 is, the more the cogging force is reduced. Thus, effects of reducing the cogging force in conventional example 1 are higher than in conventional example 2 and the present embodiment. However, in the case of conventional example 1, as apparent from the curved line A in FIG. 4, a reduction of the permeance coefficient and the demagnetization resistant capacity at the end portion of the permanent magnets is not allowed to be restrained.

On the other hand, in the case of conventional example 2 as described above, as apparent from the curved line B in FIG. 4, the permeance coefficient of the end portion of the permanent magnets is remarkably increased. Accordingly, the magnetic resistance of the end portion of the permanent magnets remarkably varies, and thus effects of reducing the cogging force in conventional example 2 are inferior to those in conventional example 1 as described above.

In the case of the rotor 10 according to the present embodiment, as apparent from the curved line C in FIG. 4, the permeance coefficient of the end portion of the permanent magnets is reduced in comparison with the curved line B of the case of conventional example 2. In other words, a magnetic resistance variation of the end portion of the permanent magnets is loosened. Thus, effects of reducing the cogging force in the present embodiment are lower than in conventional example 1 but higher than in conventional example 2.

As thus described, it is apparent that the configuration of the rotor 10 according to the present embodiment enables realization of reducing the cogging force and restraining a reduction of the demagnetization resistant capacity at the end portion of the permanent magnets in a balanced manner.

Furthermore, effects with respect to a magnetic force will be mentioned as below.

In the case of conventional example 2 as described above, the projection portions 14 that are a part of the core 12 of an electromagnetic material tightly engage with the end portion of the permanent magnets so that a magnetic flux of the end portion of the permanent magnets leaks into the projection portions 14 without heading toward a stator of an electric motor. As a result, the magnetic force of the permanent magnets is reduced. On the other hand, in the case of conventional example 1 as described above, a magnetic flux of the permanent magnets does not leak into the core 12 due to absence of the projection portions 14. In addition, also in the case of the rotor 10 according to the present embodiment, the space S as describe above is formed between the end portion 13a of the permanent magnets 13 and the cover portions 14b of the projection portions 14 so that leakage of the magnetic flux of the end portion of the permanent magnets can be more restrained than in conventional example 2 as described above. Thereby, the rotor 10 according to the present embodiment can more restrain a reduction of the magnetic force of the permanent magnets than the aforementioned conventional example 2.

Next, another embodiment will be described with reference to FIG. 5.

Figure 5:
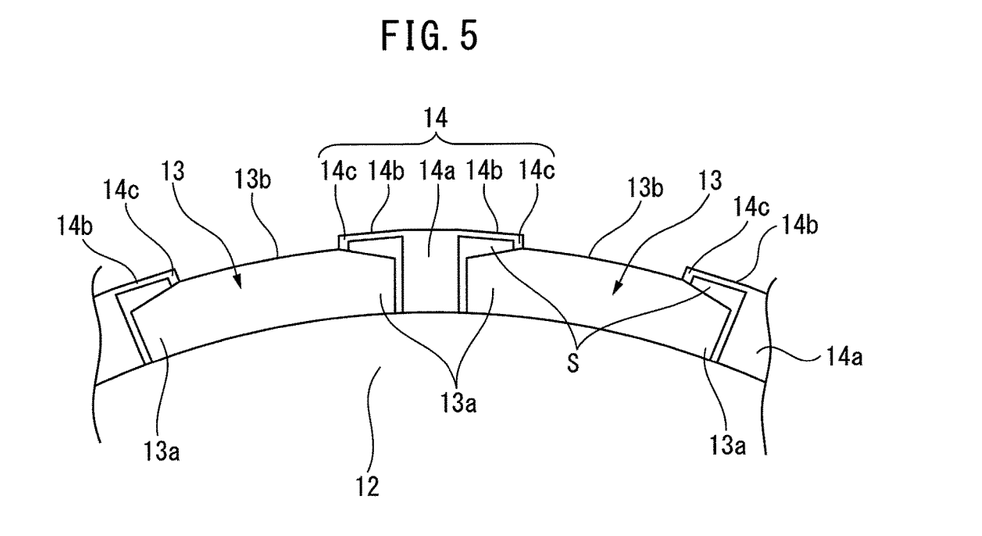
FIG. 5 is a diagram illustrating a modification of the cross-sectional structure of the rotor as illustrated in FIG. 1.

FIG. 5 is a diagram illustrating a modification of the cross-sectional structure of the rotor as illustrated in FIG. 1. Note that, in FIG. 5, the same components of the embodiment as described above is assigned the same reference signs.

In the rotor as illustrated in FIG. 5, the cover portions 14b of each projection portion 14 include a portion 14c extending to a radial direction inner side of the core 12. As apparent from FIG. 5, the portion 14c is in contact with the permanent magnets 13 and pushes the permanent magnets 13 toward the core 12. Alternatively, a tip end of the cover portions 14b in contact with the permanent magnets 13 may be the portion 14c.

In other words, each projection portion 14 as illustrated in FIG. 5 includes a pressing portion that presses the permanent magnets 13 toward the core 12, similarly to the portion 14c as described above.

By such a pressing portion, the permanent magnets 13 can be held in such a manner as not to be separated from the outer circumferential surface of the core 12 even when a centrifugal force following rotation of the rotor 10 and a magnetic attraction force due to a stator (unillustrated) disposed around the rotor 10 act on the permanent magnets 13 for a long period. Note that other configurations and effects are similar to the embodiment as described above. In other words, when the pressing portion as described above is provided, reducing the cogging force and restraining a reduction of the demagnetization resistant capacity of the end portion of the permanent magnets can be realized in a balanced manner.

Typical embodiments have been described above, but the present invention is not limited to the embodiments as described above, and various changes to forms, structures, and materials in the embodiments as described above can be made without departing from the spirit of the present invention.

ADVANTAGEOUS EFFECTS OF THE INVENTION

According to a first aspect of the present invention, the thickness of the permanent magnets in the radial direction of the core becomes smaller as from the center portion toward the end portion of the permanent magnets in the circumferential direction of the rotor core, whereby the cogging force can be reduced. When the thickness of the magnets are thus changed to aim at reduction of the cogging force, the demagnetization resistant capacity at the end portion of the magnets is reduced. Consequently, in the first aspect, the projection portions are provided on the outer circumferential surface of the core, the cover portions that cover the end portion of the magnets through the space are provided to the projection portions, and the cover portions are formed such that a height of the space in the radial direction of the core is more reduced as more separated from the base portion of the projection portions. Thereby, reducing the cogging force and restraining a reduction of the demagnetization resistant capacity of the end portion of the permanent magnets can be realized in a balanced manner.

According to a second aspect of the present invention, the pressing portion that presses the magnet toward the outer circumferential surface of the core is provided to the projection portions. Thereby, the permanent magnets can be held in such a manner as not to be separated from the outer circumferential surface of the core even when a centrifugal force following rotation of the rotor and a magnetic attraction force due to a stator disposed around the rotor act on the permanent magnets for a long period.

The invention claimed is:

1. A permanent magnet rotor for an electric motor, comprising:
   a core having a cylindrical shape;
   a plurality of magnets sequentially disposed on an outer circumferential surface of the core along a circumferential direction of the core, each magnet has a circumferential end surface; and
   a plurality of projection portions each disposed between the magnets adjacent to each other, an axial length of each projection portion being smaller than an axial length of the core, wherein
   a thickness of the magnets in a radial direction of the core is smaller as from a center portion of the magnets toward an end portion of the magnets in the circumferential direction of the core,
   the projection portions include;
      a base portion that projects from the outer circumferential surface of the core to a radial direction outer side of the core, the base portion has a circumferential end surface circumferentially spaced apart from the circumferential end surface of the magnet adjacent to the projection portion; and
      a cover portion that extends from the base portion in the circumferential direction of the core so as to be separate away from an outer surface of the magnet, and covers the end portion of the magnets through a space, the cover portion being not provided with a portion which is in contact with the outer surface of the magnet, and
   the cover portion is formed such that a height of the space in the radial direction of the core is more reduced as from the base portion toward a tip end of the cover portion.

* * * * *